United States Patent
Luoma et al.

(10) Patent No.: US 10,242,411 B2
(45) Date of Patent: Mar. 26, 2019

(54) APPARATUS FOR PROCESSING OF TRANSACTION INFORMATION

(71) Applicant: OP-Palvelut Oy, Helsinki (FI)

(72) Inventors: Kristian Luoma, Helsinki (FI); Jussi Juntunen, Helsinki (FI); Tuomas Jomppanen, Helsinki (FI); Petri Liimatta, Helsinki (FI); Antti Laitala, Helsinki (FI)

(73) Assignee: OP-PALVELUT OY, Helsinki (FI)

( * ) Notice: Subject to any disclaimer, the term of this patent is extended or adjusted under 35 U.S.C. 154(b) by 144 days.

(21) Appl. No.: 15/038,930

(22) PCT Filed: Nov. 18, 2014

(86) PCT No.: PCT/FI2014/050869
§ 371 (c)(1),
(2) Date: May 24, 2016

(87) PCT Pub. No.: WO2015/079102
PCT Pub. Date: Jun. 4, 2015

(65) Prior Publication Data
US 2016/0379311 A1    Dec. 29, 2016

(30) Foreign Application Priority Data
Nov. 29, 2013    (FI) ...................................... 20136196

(51) Int. Cl.
*G06Q 40/00* (2012.01)
*G06F 17/30* (2006.01)
(Continued)

(52) U.S. Cl.
CPC ........... *G06Q 40/12* (2013.12); *G06F 3/0481* (2013.01); *G06F 17/30* (2013.01);
(Continued)

(58) Field of Classification Search
CPC ........ G06Q 40/12; G06Q 30/06; G06Q 40/02; G06F 3/0481; G06F 17/30; G06F 17/30241; G06F 2203/04806
(Continued)

(56) References Cited

U.S. PATENT DOCUMENTS 6,883,708 B1 *   4/2005   Fiedler ................... G06Q 20/04
                                                                235/380
9,038,895 B2     5/2015   Luoma et al.
(Continued)

FOREIGN PATENT DOCUMENTS

| EP | 2 587 433 A1 | 5/2013 |
| FI | 20135155 A | 8/2014 |
| FI | 20135248 A | 9/2014 |

OTHER PUBLICATIONS

International Search Report, dated Feb. 23, 2015, from corresponding PCT Application.
(Continued)

*Primary Examiner* — A. Hunter Wilder
*Assistant Examiner* — Joseph M Mutschler
(74) *Attorney, Agent, or Firm* — Young & Thompson

(57) ABSTRACT

Apparatus for processing of transaction information, wherein transaction information relating to transactions with a payment card is transformed into a plurality of geographic sums (614, 616, 618) such that for each transaction a geographic location where the transaction took place is recognized in relation to an electronic geographic map, and monetary values of transactions performed in the same geographic location within a predetermined margin are added up to form geographic sums (614, 616, 618).

7 Claims, 7 Drawing Sheets

(51) Int. Cl.
  *G06Q 30/06* (2012.01)
  *G06Q 40/02* (2012.01)
  *G06F 3/0481* (2013.01)

(52) U.S. Cl.
  CPC ....... *G06F 17/30241* (2013.01); *G06Q 30/06* (2013.01); *G06Q 40/02* (2013.01); *G06F 2203/04806* (2013.01)

(58) Field of Classification Search
  USPC .......................................................... 705/30
  See application file for complete search history.

(56) References Cited

U.S. PATENT DOCUMENTS

2009/0150272 A1* 6/2009 Blythe ................... G06Q 40/00
  705/35
  2010/0082454 A1 4/2010 Narayanaswami et al.
  2012/0094639 A1 4/2012 Carlson et al.
  2013/0110603 A1* 5/2013 Chi ..................... G06Q 20/3224
  705/14.23
  2013/0268340 A1* 10/2013 Colon ..................... G06Q 40/08
  705/14.25
  2014/0231509 A1 8/2014 Luoma et al.
  2014/0279442 A1 9/2014 Luoma et al.

OTHER PUBLICATIONS

Finnish Search Report, dated Aug. 29, 2014, from corresponding Finnish Application.
  Finnish Office Action in corresponding Finnish Application No. 20136196, dated Jun. 6, 2016.

* cited by examiner

APPARATUS FOR PROCESSING OF TRANSACTION INFORMATION

FIELD

The invention relates to an apparatus for processing of transaction information.

BACKGROUND

The management of personal finances is challenging. Account information may be glanced with mobile devices, but the sheer amount of information and the limited size of the display impair the usability of such user interface. The mere balance of the account will tell the summary situation at a glance. However, besides being able to view individual transactions, the present user interfaces do not offer more effective ways of communicating information to the user. Further sophistication is clearly desirable in order to improve the user interface so that the financial information may be conveyed to the user with improved usability (=with improved ease of use and learnability).

BRIEF DESCRIPTION

The present invention seeks to provide an improved apparatus and improved computer program code for processing of transaction information.

According to an aspect of the present invention, there is provided an apparatus.

According to another aspect of the present invention, there is provided computer program code stored on a computer-readable medium.

The invention may provide at least some of the following advantages: the user interface may be more efficient to use, it may take less time to accomplish a particular task with the user interface, the user interface may be easier to learn, a specific user interface operation may be learned by observing the user interface, the user interface may be more satisfying to use as its implementation is both visual and intuitive, the memorability of the user interface logic may be quite good.

LIST OF DRAWINGS

Example embodiments of the present invention are described below, by way of example only, with reference to the accompanying drawings, in which FIG. 1 illustrates an example embodiment of a general operating environment;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
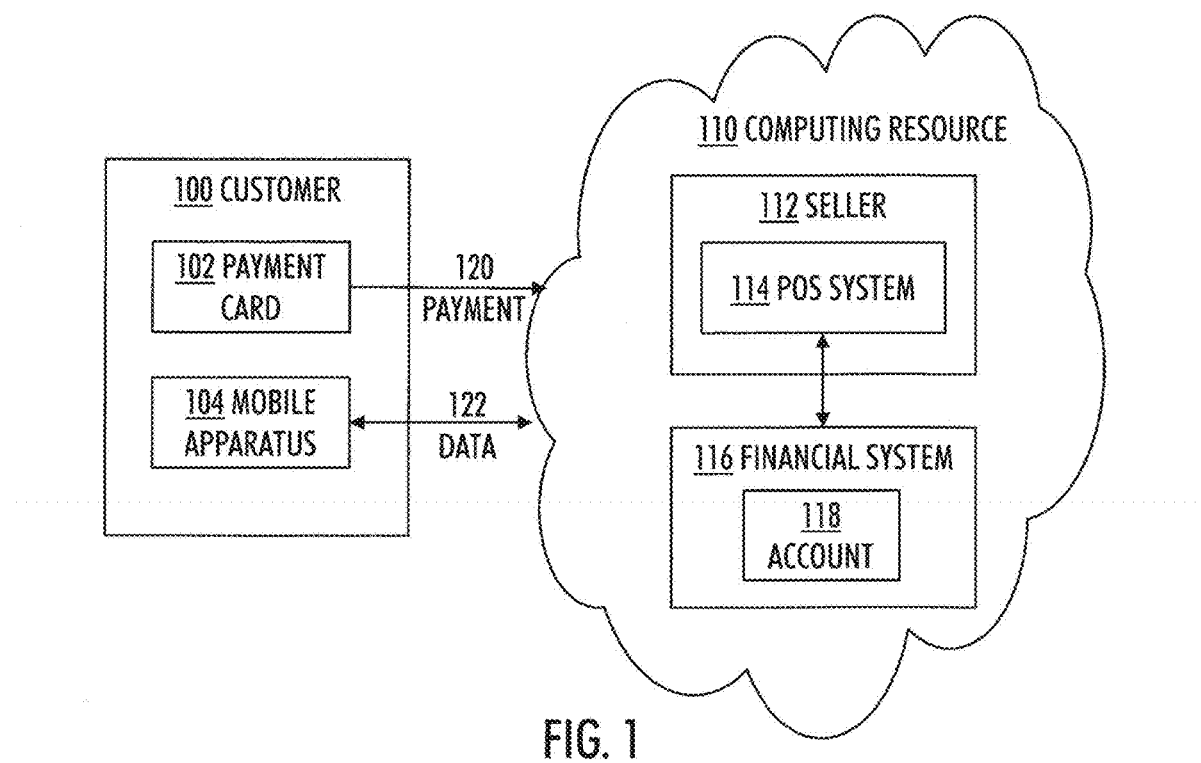

FIG. 1 illustrates an example embodiment of a general operating environment. A customer 100 interacts with at least one seller (=provider of commodity) 112. The customer 100 has in his/her possession at least one payment card 102 and a mobile apparatus 104. The customer 100 purchases a commodity from the seller 112 and makes payments 120 with his/her payment card 102.

The customer 100 may also be known as a client, buyer, purchaser, or consumer. The seller 112 may also be known as a vendor, or supplier, and even a retailer, although the term "retail" highlights the fact that the trade is business-to-consumer type rather than the business-to-business type.

In an example embodiment, the seller 112 may operate in a shop such as a store, market, or shopping mall, for example. In an example embodiment, the seller 112 may also operate without a shop, such as in an online environment realizing electronic commerce with electronic transactions and mail order.

A trade between the customer 100 and the seller 112 transfers the ownership of the commodity from the seller 112 to the customer 100, and the seller 112 gets a payment in exchange. The commodity is any marketable item produced to satisfy wants or needs, and the commodity comprises (consumer) goods and services.

The payment card 102 may be used by the cardholder 100 and accepted by the seller 112 to make payments 120 for the trade. In an example embodiment, the payment card 102 may be a credit card or a debit (or bank) card, or any other suitable payment medium, for example. In an example embodiment, the payment card 102 may be implemented as a magnetic stripe card, smart card, or a proximity card, or with any other suitable technology, for example.

Figure 5:

In an example embodiment, the mobile apparatus 104 is a portable electronic communication apparatus. A non-exhaustive list of the types of the mobile apparatus 104 includes: a mobile phone, a smartphone, a tablet computer, a general-purpose mobile computing device. In an example embodiment, the mobile apparatus 104 is a general-purpose off-the-shelf computing device, as opposed to a purpose-build proprietary equipment, whereby research & development costs will be lower as only the special-purpose software (and not the hardware) needs to be designed, implemented and tested. In FIG. 5, an example embodiment of the mobile apparatus 104 is illustrated: the mobile apparatus 104 is a smartphone or a tablet employing a multi-touch display 500. Such devices may employ a suitable operating system such as iOS, Android, or Windows Phone, for example.

In an example embodiment, the seller 112 has a system 114 such as a point of sale system. In an example embodiment, the system 114 may be a simple point of sale terminal or it may comprise a number of different hardware and software components. The system 114 may implement an electronic cash register, an inventory system, a customer relationship management system etc.

As already explained, the customer 100 may make the payment 120 with his/her payment card 102 to the system 114 of the seller 112. The system 114 may transmit the transaction(s) to a routing/acquiring/issuing bank 116. As the role of the bank is not very important, the complex structure is depicted with a single entity 116, although the situation may in reality be quite complex. The acquiring bank processes the credit or debit card 102 payments, and it acquires credit card payment from the card-issuing banks within an association. The issuing bank offers the (possibly card association branded) payment cards 102 to the consumers 100, and it issues the payment to the acquiring bank on behalf of the consumer 100. Well-known card associations include Visa, MasterCard, American Express, and Diners Club, for example.

As shown in FIG. 1, a computing resource 110 implements the required interaction 120, 122 with the payment card 102 and the mobile apparatus 104.

The computing resource 110 comprises the system 114 and the financial system 116, but it may also comprise other systems not illustrated in FIG. 1. The computing resource 110 may also comprise, instead of, or in addition to the elements 114, 116 shown in FIG. 1, a service provider maintaining the computing resource 110. The service provider may be an application service provider, which provides the computer-based service with Internet hosting for the customers 100, sellers 112 and financial institutions. In an example embodiment, the service provider 110 is the applicant, OP-Pohjola Group, or some other financial institution. It is also to be noted that the integration grade between the computing resource 110, system 114, and the routing/acquiring/issuing bank 116 may change: every element may be a separate actor, or one or more elements may be combined to a multi-actor element.

In an example embodiment, the computing resource 110 may be implemented as a single server computer or as a cluster of computers. The server 110 is a part of the client-server computing model that acts as distributed application which partitions tasks or workloads between the provider of a resource or service, called server, and the service requester, called client. The server 110 may serve both the mobile apparatus 104 and the systems 114, 116. The server computer 110 is a host that is running one or more server programs which share their resources with clients 104, 114, 116. The client 104, 114, 116 may request a server's content or service function. The client 104, 114, 116 therefore initiates a communication session with the server 110 which awaits incoming requests.

The computing resource 110 may also operate according to the cloud computing model. Naturally, besides these example embodiments of the computing resource 110, other feasible computing architectures may be utilized as well to implement the hardware and software of the computing resource 110. Consequently, besides operating according to the client/server architecture, push technology may be utilized as well. In push technology, the request for a transaction is initiated by the server 110, whereas with the pull technology the request for the information is initiated by the client 104, 114, 116.

The use of the payment card 102 for payments 120 generates transaction information 122. Also the use of the mobile apparatus 104 for payments 120 from an account 118 linked with the payment card 102 may generate transaction information 122. Also other transactions directed at the account 118 may generate transaction information. In an example embodiment, the transactions with the payment card 102 comprise at least one of the following: a trade of a commodity between the user 100 of the payment card 102 and the retailer 112, a cash withdrawal with the payment card 102, a payment with the payment card 102. In an example embodiment, the cash withdrawal is performed by coupling the payment card 102 with an automated teller machine (ATM).

In an example embodiment, the transactions come to the computing resource 110 directly from the (point of sale) systems 114, or via an intermediary such as a bank or another financial institution 130.

In an example embodiment, the transaction information 122 may be transmitted from the computing resource 110 to the mobile apparatus 104 in a wireless connection. In an example embodiment, the transaction information 122 is transmitted utilizing a plurality of data packets, for example. The packet may include control information and the actual payload. The term "packet" also includes the possibility that messages are used, i.e., the data is divided into messages, which, in turn, are transported by the packets.

In an example embodiment, the transaction information 122 is transmitted from the system 114 to the mobile apparatus 104.

In an example embodiment, the transaction information 122 is transmitted from the financial system 116 to the mobile apparatus 104.

In an example embodiment, the transaction information 122 is transmitted from a system (not illustrated in FIG. 1 but the computing resource 110 comprises that system) of the service provider to the mobile apparatus 104.

Figure 2:
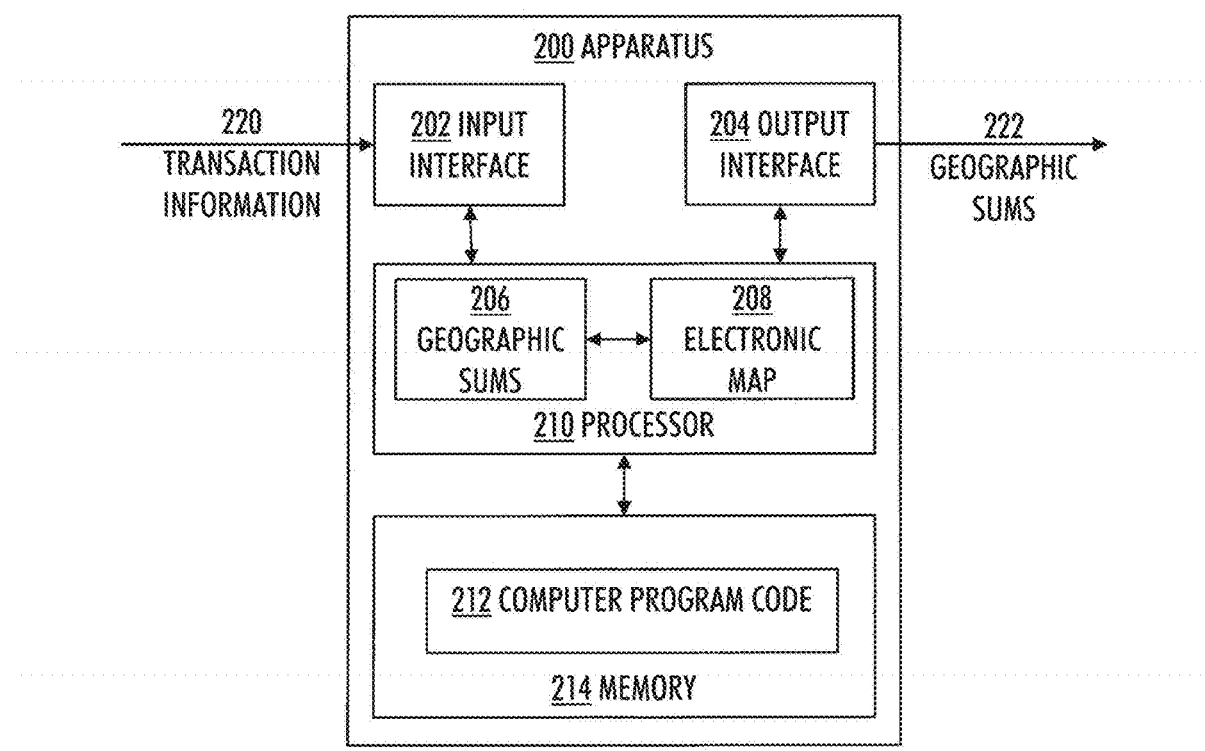
FIG. 2 illustrates an example embodiment of an apparatus.

FIG. 2 illustrates an apparatus 200 for processing of transaction information. The apparatus 200 comprises an input interface 202, an output interface 204, one or more processors 210, and one or more memories 214 including computer program code 212.

The one or more memories 214 and the computer program code 212 are configured to, with the one or more processors 210, cause the apparatus 200 to obtain, with the input interface 202, transaction information 220 relating to transactions with the payment card 102.

The one or more memories 214 and the computer program code 212 are configured to, with the one or more processors 210, cause the apparatus 200 to transform the transaction information 220 into a plurality of geographic sums 206 such that for each transaction a geographic location where the transaction took place is recognized in relation to an electronic geographic map 208, and monetary values of transactions performed in the same geographic location within a predetermined margin are added up to form geographic sums 206.

The one or more memories 214 and the computer program code 212 are configured to, with the one or more processors 210, cause the apparatus 200 to output, with the output interface 204, the plurality of the geographic sums 222 on the electronic geographic map 208.

The transaction information 220 may comprise separate individual transactions such as trades, cash withdrawals and/or payments, and/or summary transaction information. With the described processing, transaction information 220 is transformed in such a way that the usability of the user interface displaying this transformed information is enhanced.

In an example embodiment, the apparatus 200 is at least one of the following: an electronic circuit, a portable mobile apparatus 104, a computing resource 110.

If the apparatus 200 is implemented as an electronic circuit, it may be a building block in a device needing the described processing. Depending on the scale of integration, the electronic circuit may include various hardware blocks. In its simplest form, the electronic circuit may be a microprocessor, whereby the input interface 202 and output interface 204 are just ports or other means enabling communication with other hardware blocks. If the electronic circuit comprises telecommunications hardware, then the input interface 202 and output interface 204 may comprises wireless or wired communication means such as a network interface or a wireless transceiver.

If the apparatus 200 is implemented as a portable mobile apparatus, the input interface 202 may comprise a wireless transceiver, and the output interface 204 may comprise a user interface or a connection to an external display.

If the apparatus 200 is implemented as a computing resource, the input interface 202 may comprise a wired and/or wireless communication interface, and the output interface 204 may also comprise a wired and/or wireless communication interface.

Naturally, depending on the system design, the described transformation processing may be split between the mobile apparatus 104 and the computing resource 110.

Figure 3:
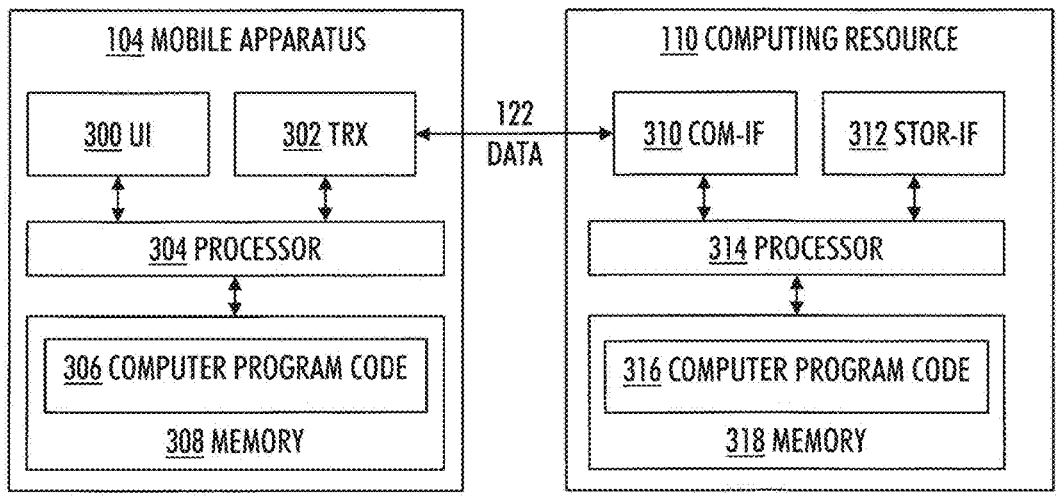
FIG. 3 illustrates example embodiments of a mobile apparatus and a computing resource.

Next, let us study FIG. 3 illustrating example embodiments of the mobile apparatus 104 and the computing resource 110.

The mobile apparatus 104 comprises a user interface 300, a wireless transceiver 302, one or more processors 304, and one or more memories 308 including computer program code 306.

In an example embodiment, the wireless transceiver 302 may be interoperable with various wireless standard/non-standard/proprietary communication networks such as any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc), WiMAX (Worldwide Interoperability for Microwave Access, or Wi-Fi, for example.

In an example embodiment, the wireless transceiver 302, while communicating with a mobile phone network, may require a subscriber identity module (SIM), which may be an integrated circuit storing subscriber data, which is network-specific information used to authenticate and identify subscribers on the cellular network. The subscriber identity module may be embedded into a removable SIM card, on a mini-SIM card, for example. Furthermore, the mobile apparatus 104 may include a SIM card reader, for example. Besides being implemented on a SIM card, the subscriber identity module may be implemented with other techniques as well, such as a virtual/embedded SIM.

In an example embodiment, the user interface 300 implements the exchange of graphical, textual and auditory information with the customer 100. The user interface 300 may be realized with various techniques, such as a display, means for producing sound, a keyboard, and/or a keypad, for example. The display may be a liquid crystal display, for example, but it may also be implemented by any appropriate technique, such as with an active-matrix organic light-emitting diode. The display may also incorporate other user interaction means, such as touch input, or haptic feedback, i.e. the display may be a multi-touch display 500. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 300 may comprise other user interface components, for example various means for focusing a cursor (mouse, track ball, arrow keys, touch sensitive area etc.) or elements enabling audio control.

Naturally, the mobile apparatus 104 may include various other parts, such as a battery, a camera, a radio-frequency identifier reader, a positioning receiver, but as they are not needed to further illustrate the example embodiments, they will not be further described.

The computing resource 110 comprises a communication interface 310, a storage interface 312, one or more processors 314, and one or more memories 318 including computer program code 316. In an example embodiment, the computing resource 110 is a computer, such as a single server computer or a cluster of computers, whereby the one or more processors 314 and the one or more memories 318 may be implemented by suitable processors, even in parallel or multicore embodiments, for example.

The communication interface 310 enables communication with other parts of the system, such as the communication 122 with the mobile apparatus 104. The communication interface 310 may be coupled with a communication network. The communication network may comprise a wired network, such as the Internet, and also a wireless system capable of communicating with the wireless transceiver 302 of the mobile apparatus 104. Consequently, the communication interface 310 utilizes either a wired network interface or a radio transceiver.

The storage interface 312 enables storage of data into persistent memory, and it may also comprise a database interface to a database. The memory/database coupled to the storage interface 312 may reside in the computing resource 110, or in another resource.

In an example embodiment, the term 'processor' 304, 314 refers to a physical device that is capable of processing data in a computer or other digital electronic device. Depending on the processing power needed, the mobile apparatus 104 and the computing resource 110 may each comprise several processors 304, 314 such as parallel processors or one or more multicore processors. A non-exhaustive list of implementation techniques for the processor 304, 314 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

In an example embodiment, the term 'memory' 308, 318 refers to a physical device that is capable of storing the computer program code 306, 316 and data on a temporary or permanent basis for use in a computer or other digital electronic device. In an example embodiment, the term 'memory' refers to working memory (also known as primary storage, main memory or internal storage) directly accessible to the processor 304, 314. In an example embodiment, the working memory may be implemented as a random-access memory (RAM), such as a dynamic RAM, DRAM.

Figure 4:
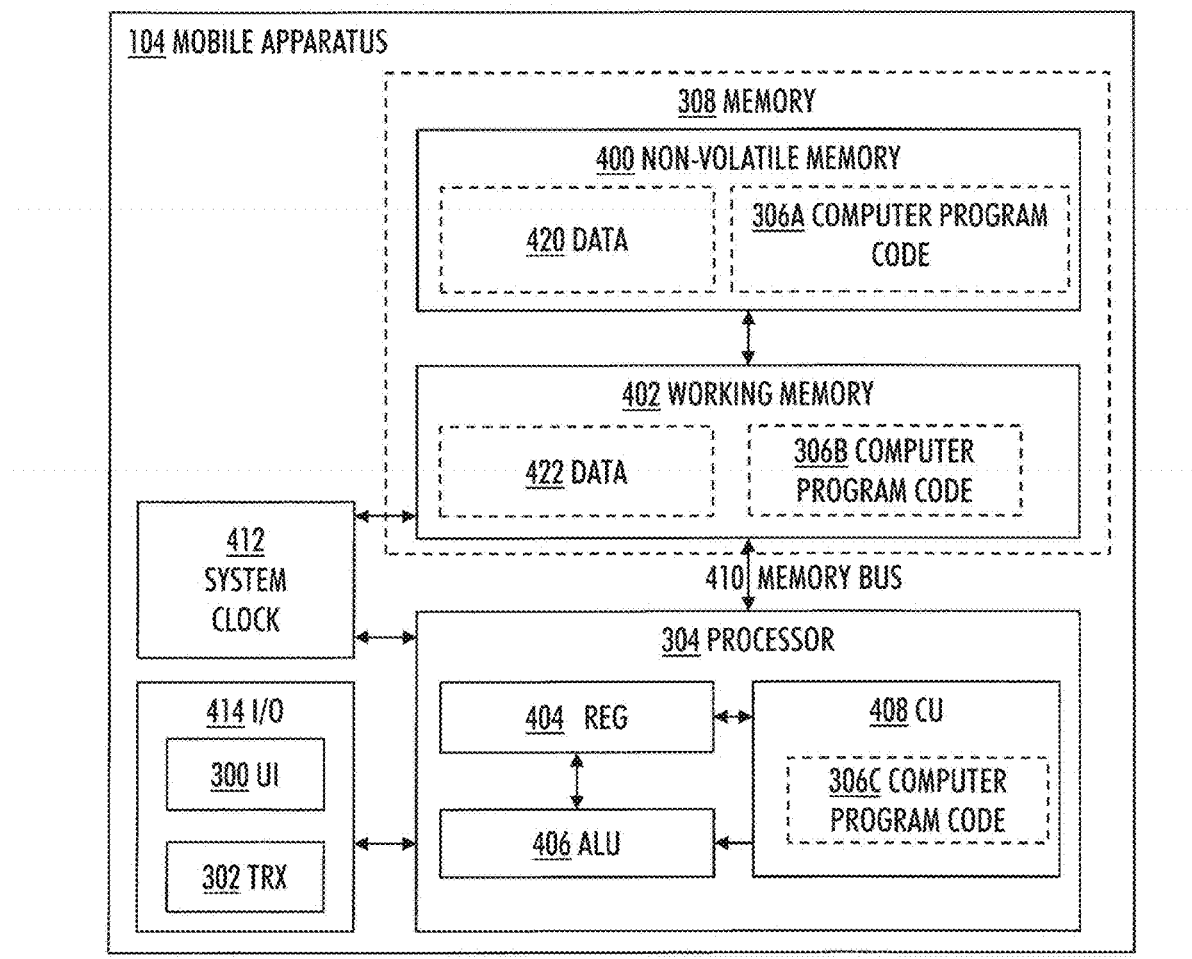
FIGS. 4 and 5 illustrate example embodiments of the mobile apparatus.

Let us next study FIG. 4 illustrating an example embodiment of the mobile apparatus 104. The mobile apparatus 104 may include an electronic digital computer, which may comprise a non-volatile memory 400 and a working memory 402 as the memory 308, the processor 304, a system clock 412 and an input/output 414 including the user interface 300 and the wireless transceiver 302. Naturally, the computer may comprise a number of other peripheral devices, not illustrated here for the sake of clarity. Also, the architecture of FIG. 4 is just one example embodiment as other feasible computing architectures may be utilized as well to implement the hardware and software of the mobile apparatus 104. It is also to be noted that the architecture of FIG. 4 may be applied as well, changing those things which need to be changed, to the implementation of the computing resource 110 as a single computer or a cluster of computers.

In an example embodiment, the system clock 412 constantly generates a stream of electrical pulses, which cause the various transferring operations within the computer to take place in an orderly manner and with specific timing.

In an example embodiment, the processor 304 may be implemented as a microprocessor implementing functions of a central processing unit (CPU) on an integrated circuit. The CPU 304 is a logic machine executing the computer program code 306C. The computer program code 306A/306B/306C may be coded as a computer program using a programming language, which may be a high-level programming language, such as C, C++, or Java, or a low-level programming language, such as a machine language, or an assembler. There are many ways to structure the computer program code 306A/306B/306C. In an example embodiment, the operations of the computer program code 306A/306B/306C may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 306A/306B/306C for performing a wide variety of standard operations.

The CPU 304 may comprise a set of registers 404, an arithmetic logic unit (ALU) 406, and a control unit (CU) 408. The control unit 408 is controlled by the computer program code 306C transferred to the CPU 304 from the working memory 402. The working memory 402 is directly or indirectly connected to the CPU 304 via a memory bus 410 including two buses: an address bus and a data bus. The CPU 304 sends a memory address indicating the desired location of data 422 or computer program code 306B through the address bus, whereupon the CPU 304 reads or writes the data itself from/to the working memory 402 using the data bus.

The control unit 408 may contain a number of microinstructions for basic operations. The implementation of the microinstructions may vary, depending on the CPU design. The microprocessor 304 may also have an operating system (such as a general-purpose operating system), which may provide the computer program code 306C with system services. During running of the computer program code 306B, the computer program code 306B or a part of it are transferred via the memory bus 410 from the working memory 402 into the control unit 408, wherein usually a portion of the computer program code 306C resides and controls the operation.

In an example embodiment, the non-volatile memory 400 retains the stored information even when not powered. Examples of non-volatile memory include read-only memory (ROM), flash memory, magnetic computer storage devices such as hard disk drives, and optical discs. As is shown in FIG. 4, the non-volatile memory 400 may store both data 422 and the computer program code 306A.

An example embodiment provides a computer-readable medium comprising the computer program code 306A. Said computer program code 306A, when executed on the mobile apparatus 104, causes the mobile apparatus 104 to perform the operations required to implement the described example embodiments. In an example embodiment, the computer program code 306A may be in source code form, object code form, or in some intermediate form. The computer-readable medium may comprise at least the following: any entity or device capable of carrying computer program code 306A to the mobile apparatus 104, a record medium, a computer memory, a read-only memory, an electrical carrier signal, a telecommunications signal, and a software distribution medium. In some jurisdictions, depending on the legislation and the patent practice, the computer-readable medium may not be the telecommunications signal. In an example embodiment, the computer-readable medium may be a non-transitory computer readable storage medium.

Now that the basic structures of the mobile apparatus 104 and the computing resource 110 have been described, we may proceed in describing the operation of the mobile apparatus 104 in more detail with reference to FIGS. 6, 7, 8, and 9.

In FIGS. 6, 7, 8 and 9 example embodiments of the user interface 300 of the mobile apparatus 104 are described.

As was earlier explained, the transaction information 220 is transformed into a plurality of geographic sums 206 such that for each transaction a geographic location where the transaction took place is recognized in relation to an electronic geographic map 208, and monetary values of transactions performed in the same geographic location within a predetermined margin are added up to form geographic sums 206. Furthermore, the plurality of the geographic sums 222 on the electronic geographic map 208 is outputted.

In an example embodiment, the one or more memories 214 and the computer program code 212 are further configured to, with the one or more processors 210, cause the apparatus 200 further to perform at least one of the following:

obtain the transaction information 220 from the electronic service 110 with the wireless transceiver 302 being coupled with the input interface 202;

output the plurality of the geographic sums 222 with the display 500 being coupled with the output interface 204.

Figure 6:
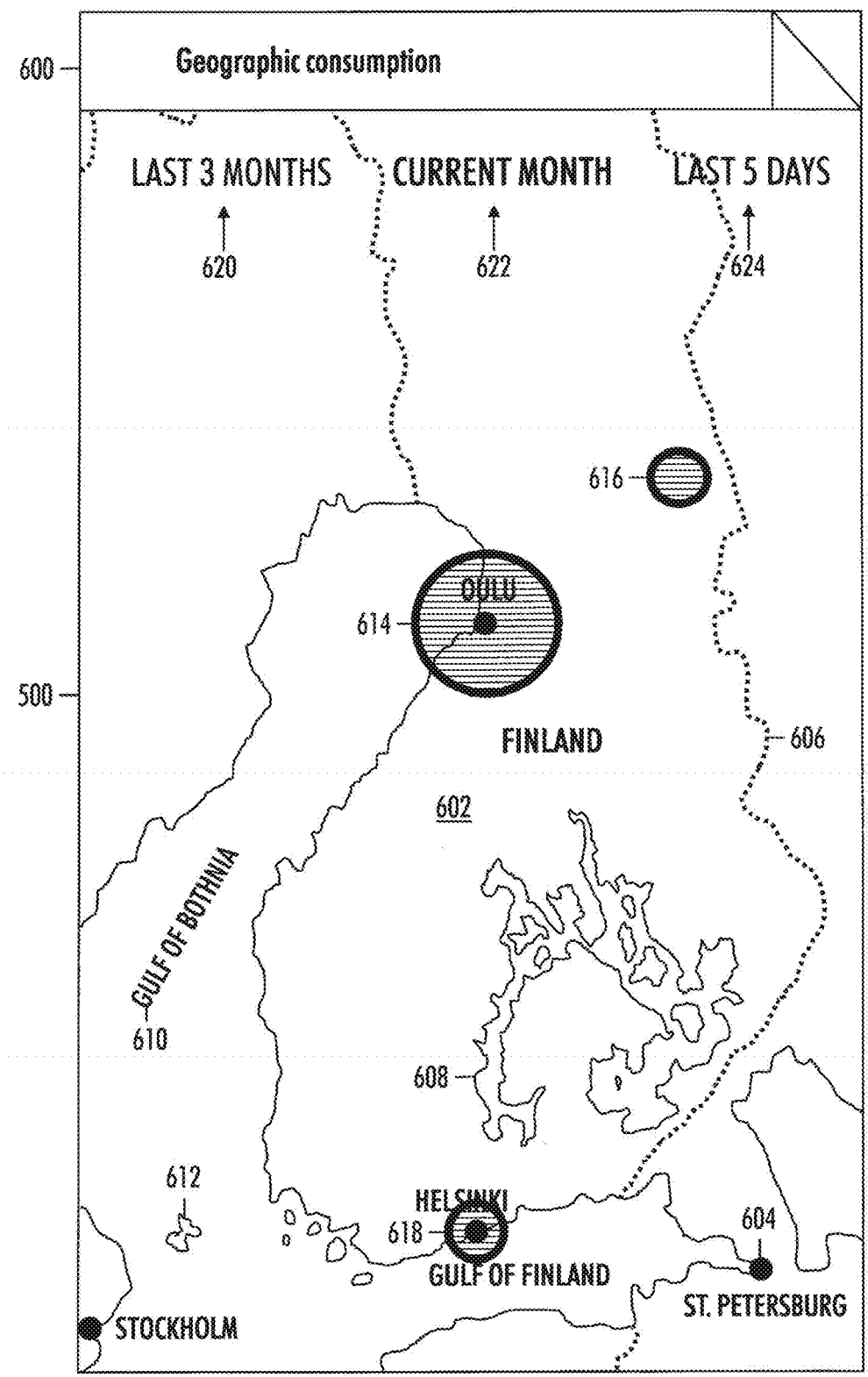
FIGS. 6, 7, 8 and 9 illustrate example embodiments of a user interface displaying transaction information as transformed into a plurality of geographic sums on an electronic geographic map.

FIG. 6 illustrates the multi-touch display 500 of the mobile apparatus 104. A view 600 called "Geographic consumption" is displayed on the display 500. An electronic geographic map 602 is displayed across the display 500. The map 602 may comprise various details, such as cities 604, borders 606, lakes 608, seas 610, islands 612, mountains, topography, and other descriptions used in cartography.

In the example embodiment of FIG. 6, user interface controls 620, 622, 624 are overlaid on the map 602. The user may choose the time period for which the geographic sums are shown: last three months 620, current month 622, or the last five days 624. The present selection is bolded: the view for the current month 622 has been selected.

In FIG. 6, the geographic sums 614, 616, 618 are illustrated for three locations: Oulu 614, Helsinki 618, and an unnamed position 618.

In an example embodiment, the one or more memories 214 and the computer program code 212 are further configured to, with the one or more processors 210, cause the apparatus 200 further to output, with the output interface 204, the plurality of the geographic sums 614, 616, 618 as numerals and/or geometric shapes on the electronic geographic map 602 being displayed as a static, dynamic and/or interactive two- or three-dimensional map representing geographic locations employing continents, countries, states, cities, towns, villages, municipalities, postal codes and/or street addresses.

In FIG. 6, the geographic sums 614, 616, 618 are illustrated with geometric shapes, by two-dimensional circles to be precise, and the electronic geographic map 602 is a two-dimensional map.

In an example embodiment, the one or more memories 214 and the computer program code 212 are further configured to, with the one or more processors 210, cause the apparatus 200 further to output, with the output interface 204, the geographic sums 614, 616, 618 such that their monetary values in relation to each other are represented by geometric objects, whose size represents the magnitude of the monetary value. In our example embodiment of FIG. 6, the geometric objects are two-dimensional circles, whose surface area represents the magnitude of the monetary value of the geographic sums. The user 100 will immediately see his/her spending: the major consumption has taken place in Oulu 614, whereas two trips to Helsinki 618 and Kuusamo 616 consumed the funds less.

In an example embodiment, the one or more memories 214 and the computer program code 212 are further configured to, with the one or more processors 210, cause the apparatus 200 further to output the geographic sums 222 represented by the geometric objects such that each geographic sum is represented by a two-dimensional circle or a three-dimensional sphere.

In the example embodiment of FIGS. 6, 7, 8 and 9, the map 620 is dynamic as it uses a zoomable user interface: the user 100 may change the scale of the viewed area in order to see more detail or less detail, and the user 100 may pan across the virtual surface 602 in two dimensions and zoom into objects of interest.

If the user 100 zooms out of the view 600, not only Finland is shown, but also its neighbour countries Sweden, Norway, Russia and Estonia become more visible. If the user continues to zoom out further, Europe will be shown in the view 600, and, ultimately, even the whole world map may be shown in the view 600.

Figure 7:
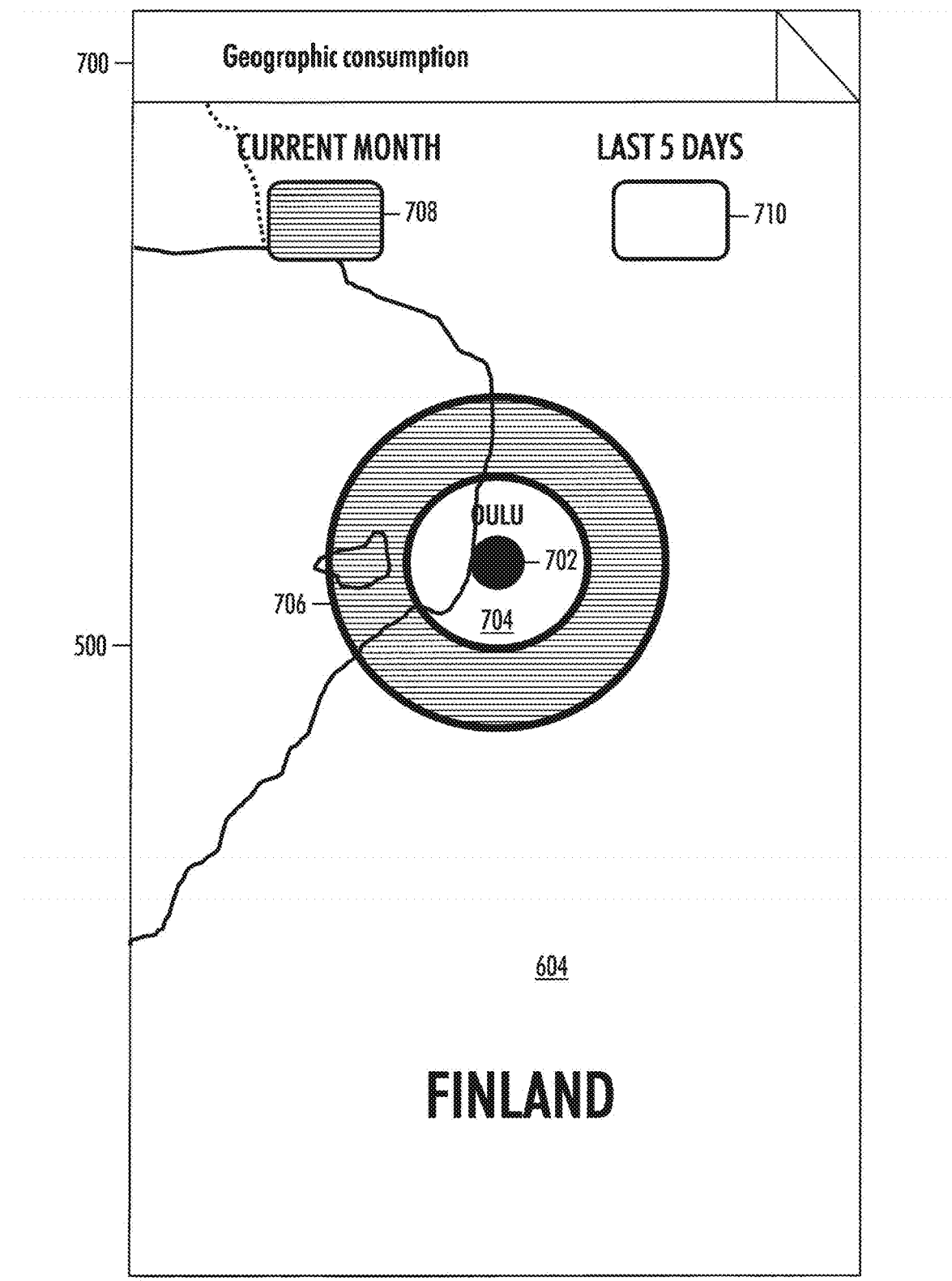

On the other hand, if the user 100 zooms in, a more detailed view 600 will be shown, displaying states, cities, towns, villages, municipalities, and/or postal codes. A fine level of detail will include street addresses. FIG. 7 illustrates a view 700, where the user 100 has started to zoom in to the Oulu 702, and in FIG. 8 a street-level view 800 has been reached.

In an example embodiment, the one or more memories 214 and the computer program code 212 are further configured to, with the one or more processors 210, cause the apparatus 200 further to obtain zoom control with the input interface 202; and transform the transaction information 220 into the plurality of the geographic sums 222 such that the same geographic location is a continent if the zoom control indicates a continental view, or the same geographic location is a country if the zoom control indicates a country view, or the same geographic location is a state is if the zoom control indicates a state view, or the same geographic location is a city or a town or a village if the zoom control indicates a city/town/village view, or the same geographic location is a municipality if the zoom control indicates a municipal view, or the same geographic location is a postal code if the zoom control indicates a postal code view, or the same geographic location is a street address if the zoom control indicates a street view. Effectively, this means that the granularity of the geographic sums 222 may be adjusted: in FIG. 6, the granularity level is city/town/village view as the geographic sums 614, 616, 618 are mapped to cities (Oulu, Helsinki) and towns (Kuusamo). If the user 100 zooms out from the country view 600 of FIG. 6, a continental view showing Europe, and, ultimately, also the other continents may be shown on the display 500.

Figure 8:

FIG. 8 illustrates another granularity level: the geographic sum 810 is illustrated for a specific street address 808 in a street view 800. As shown in FIG. 8, the map 604 now illustrates blocks 802, street names 804 and house numbers 806, for example. In an example embodiment, also other details may be shown to the user 100 in the view 800. Ultimately, the view 800 may also offer an even more detailed view, within a shopping mall, or within a skyscraper, for example. The view 800 may even be three-dimensional, if necessary and if supported by the technical characteristics of the display 500.

As was explained earlier, the monetary values of transactions performed in the same geographic location within the predetermined margin are added up to form the geographic sums 614, 616, 618. The "predetermined margin" may vary depending on the choice of the "same geographic location". If the same geographic location refers to a specific continent, the "same geographic location within the predetermined margin" refers to a specific set of countries; Europe, for example, consists of a set of predetermined countries: Finland, Sweden, Norway, Denmark, Germany etc. For concepts like "countries", "states", "cities" and "towns", "villages", "municipalities" it is relatively easy to determine whether the transaction took place within a specific place, in Oulu, for example. If the same geographic location refers to a specific postal code, the "same geographic location within the predetermined margin" may refer to a range of postal codes or a set of postal codes; to the city of Oulu, for example, belongs a large set of postal codes: 90100, 90120, 90130 etc. If the same geographic location refers to a specific street address, "the same geographic location within the predetermined margin" may refer to a specific street name, or to a specific street name combined with one or more house numbers or a range of house numbers. Likewise, in the shopping mall on in the skyscraper, the definition for the "same geographic location within the predetermined margin" may refer to a specific part of the building, such as a specific wing or a specific floor, or a set of specific locations within the building complex.

Figure 9:

FIG. 9 illustrates that further details may be shown to the user 100 as well in the view 900, in this example embodiment the precise geographic sum 810 is also shown as a numeral 902 stating that the user 100 has spent 888 euros in that location.

In an example embodiment illustrated in FIG. 7, the one or more memories 214 and the computer program code 212 are further configured to, with the one or more processors 210, cause the apparatus 200 further to perform:

process each geographic sum such that its each transaction that took place within a predetermined short date range is summed into a short term sum 704;

process each geographic sum such that its each transaction that took place within a predetermined long date range is summed into a long term sum 706, wherein the long date range is longer than the short date range;

output, with the output interface 204, the plurality of the geographic sums such that the short term sum 704 and the long term sum 706 are superimposed on top of each other as geometric objects, such that their monetary values in relation to each other are represented by geometric objects, whose size represents the magnitude of the monetary value.

In the view 700 of FIG. 7, the legend is also given for the user 100: the short date range is for the last five days 710, and the long date range is for the current month 708.

From the view 700 of FIG. 7, the user 100 may immediately see the relation of his/her spending in the last five days 704 as compared to the spending of the current month 706.

Note that FIGS. 6, 7, 8 and 9 only illustrate some views 600, 700, 800, 900. Depending on the design, the scheme may include many other views as well. In an example embodiment, the embodiments are applied within the Pivo electronic wallet mobile application of OP-Pohjola Group, described in other co-pending patent applications FI 20135155, FI 20135248 and U.S. Ser. No. 14/072,962. In an example embodiment, the views 600, 700, 800, 900 may be programmed as layers, which may be brought on the display 500 by a suitable manipulation of a user interface object. Also various menu and sub-menu structures may be utilized. The use of the multi-touch screen 500 enables the implementation of the user interface manipulation with various gestures: tapping, swiping, pinching etc.

It will be obvious to a person skilled in the art that, as technology advances, the inventive concept can be implemented in various ways. The invention and its embodiments are not limited to the example embodiments described above but may vary within the scope of the claims.

The invention claimed is:

1. An apparatus comprising:
an input interface;
an output interface;
one or more processors; and
one or more memories including computer program code, the one or more memories and the computer program code configured to, with the one or more processors, cause the apparatus at least to:
obtain, with the input interface, transaction information relating to transactions with a payment card;
transform the transaction information relating to the transactions into a plurality of geographic sums, by relating a respective geographic location where each of the transactions took place to an electronic geographic map, and monetary values of transactions performed in the same geographic location within a predetermined margin are added up to form geographic sums;
output, with the output interface, the plurality of the geographic sums on the electronic geographic map;
output, with the output interface, the plurality of the geographic sums as numerals and/or geometric shapes on the electronic geographic map being displayed as a static, dynamic and/or interactive two- or three-dimensional map representing geographic locations employing continents, countries, states, cities, towns, villages, municipalities, postal codes, street addresses, specific street names, specific street names combined with one or more house numbers or a range of house numbers, specific parts of buildings, specific parts of shopping malls, specific parts of skyscrapers, specific wings of buildings, specific floors of buildings, and/or a set of specific locations within building complexes;
sum each geographic sum having a transaction that took place within a predetermined short date range into a short term sum;
sum each geographic sum having a transaction that took place within a predetermined long date range into a long term sum, wherein the long date range is longer than the short date range; and
output and display, with the output interface to a display being coupled to the output interface, the plurality of the geographic sums on the electronic geographic map with the short term sum and the long term sum superimposed on top of each other as geometric objects, the monetary values of the short term sum and the long term sum in relation to each other being represented by geometric objects, whose size represents the magnitude of the respective monetary value.

2. The apparatus of claim 1, wherein the transactions with the payment card comprise at least one of the following: a trade of a commodity between a user of the payment card and a retailer, a cash withdrawal with the payment card, and a payment with the payment card.

3. The apparatus of claim 1, wherein the one or more memories and the computer program code are further configured to, with the one or more processors, cause the apparatus further to:
obtain zoom control with the input interface;
wherein the same geographic location is a continent when the zoom control indicates a continental view, or the same geographic location is a country when the zoom control indicates a country view, the same geographic location is a state when the zoom control indicates a state view, the same geographic location is a city or a town or a village when the zoom control indicates a city/town/village view, the same geographic location is a municipality when the zoom control indicates a municipal view, the same geographic location is a postal code when the zoom control indicates a postal code view, or the same geographic location is a street address when the zoom control indicates a street view.

4. The apparatus of claim 1, wherein the one or more memories and the computer program code are further configured to, with the one or more processors, cause the apparatus further to perform at least one of the following:
obtain the transaction information from an electronic service with a wireless transceiver being coupled with the input interface; and
output the plurality of the geographic sums with the display being coupled with the output interface.

5. The apparatus of claim 1, wherein the one or more memories and the computer program code are further configured to, with the one or more processors, cause the apparatus further to: output the geographic sums represented by the geometric objects, each geographic sum being represented by a two-dimensional circle or a three-dimensional sphere.

6. The apparatus of claim 1, wherein the apparatus is at least one of the following: an electronic circuit, a portable mobile apparatus, and a computing resource.

7. A non-transitory computer readable storage medium comprising computer program code which, when executed on an apparatus causes the apparatus at least to:
   obtain transaction information relating to transactions with a payment card;
   transform the transaction information relating to the transactions into a plurality of geographic sums by relating a respective geographic location where each of the transactions took place to an electronic geographic map, and monetary values of transactions performed in the same geographic location within a predetermined margin are added up to form geographic sums;
   output the plurality of the geographic sums on the electronic geographic map;
   output the plurality of the geographic sums as numerals and/or geometric shapes on the electronic geographic map being displayed as a static, dynamic and/or interactive two- or three-dimensional map representing geographic locations employing continents, countries, states, cities, towns, villages, municipalities, postal codes, street addresses, specific street names, specific street names combined with one or more house numbers or a range of house numbers, specific parts of buildings, specific parts of shopping malls, specific parts of skyscrapers, specific wings of buildings, specific floors of buildings, and/or a set of specific locations within building complexes;
   sum each geographic sum having a transaction that took place within a predetermined short date range into a short term sum;
   sum each geographic sum having a transaction that took place within a predetermined long date range into a long term sum, wherein the long date range is longer than the short date range; and
   output and display the plurality of the geographic sums on the electronic geographic map with the short term sum and the long term sum superimposed on top of each other as geometric objects, the monetary values of the short term sum and the long term sum in relation to each other being represented by geometric objects, whose size represents the magnitude of the respective monetary value.

\* \* \* \* \*